US011620253B2

(12) United States Patent
Beresford-Wood et al.

(10) Patent No.: US 11,620,253 B2
(45) Date of Patent: *Apr. 4, 2023

(54) BOARD PORTAL SUBSIDIARY MANAGEMENT SYSTEM, METHOD, AND COMPUTER PROGRAM PRODUCT

(71) Applicant: NASDAQ, INC., New York, NY (US)

(72) Inventors: Bret Beresford-Wood, Lafayette, IN (US); Christina Khail, Spokane, WA (US)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,119

(22) Filed: Nov. 12, 2021

(65) Prior Publication Data

US 2022/0129407 A1    Apr. 28, 2022

Related U.S. Application Data

(63) Continuation of application No. 17/033,184, filed on Sep. 25, 2020, now Pat. No. 11,176,080, which is a continuation of application No. 16/684,391, filed on Nov. 14, 2019, now Pat. No. 10,831,697, which is a continuation of application No. 15/912,805, filed on
(Continued)

(51) Int. Cl.
G06F 15/16      (2006.01)

(52) U.S. Cl.
CPC .................................. *G06F 15/16* (2013.01)

(58) Field of Classification Search
CPC ......... G06F 2221/2107; G06F 12/1408; G06F 21/10; G06F 21/6245; G06F 17/30867; G06F 21/00; H04L 9/00; H04L 29/06
See application file for complete search history.

(56) References Cited

U.S. PATENT DOCUMENTS 7,636,841 B2 * 12/2009 Wanek ................ H04L 12/1822
709/204
2004/0073615 A1    4/2004 Darling
(Continued)

OTHER PUBLICATIONS

Ruck, Joe (2008). Opening Your Board Portal: The new world of online governance is waiting, BoardVantage <http://www.boardvantage.com/data-resources/articles/corporate-board-2008-05.pdf>.
(Continued)

*Primary Examiner* — Gil H. Lee
*Assistant Examiner* — Juan C Turriate Gastulo
(74) *Attorney, Agent, or Firm* — Nixon & Vanderhye P.C.

(57) ABSTRACT

A board portal system provides the ability to manage multiple boards, where each of the boards may be a separate legal entity. The board portal may provide the ability to establish links between the multiple boards and create parent-child relationships with subsidiary boards. With the board portal, users can create content and make it viewable and accessible across multiple boards that related through a parent-child relationship. At the same time, the board portal maintains a requisite level of separation between the related boards in the portal using encryption and/or other separation techniques. As a result, the board portal facilitates flexible workflow patterns and communication processes based on the proper hierarchical structure that exists between the parent organization and its subsidiaries.

20 Claims, 17 Drawing Sheets

Related U.S. Application Data

Mar. 6, 2018, now Pat. No. 10,509,763, which is a continuation of application No. 13/038,053, filed on Mar. 1, 2011, now Pat. No. 9,940,300.

(60) Provisional application No. 61/310,340, filed on Mar. 4, 2010.

(56) References Cited

U.S. PATENT DOCUMENTS

| | | | |
|---|---|---|---|
| 2004/0123242 A1* | 6/2004 | McKibben | G06F 16/10 715/201 |
| 2005/0108268 A1* | 5/2005 | Saintry | G06Q 99/00 707/999.102 |
| 2008/0120432 A1 | 5/2008 | Lamoureux et al. | |
| 2008/0215727 A1 | 9/2008 | Denis et al. | |
| 2008/0294899 A1* | 11/2008 | Gazzetta | G06F 21/6245 713/170 |
| 2009/0065572 A1* | 3/2009 | Jain | G06Q 20/355 235/492 |
| 2011/0219078 A1 | 9/2011 | Beresford-Wood et al. | |

OTHER PUBLICATIONS

Board Portal for Community Banks. Nov. 26, 2009. Diligent, <http://web.archive.org/web/20091126185332/http://www.wib.org/products_services/VIP_program/wibsco_diligent.html>.

* cited by examiner

Fig. 1
A Board Portal
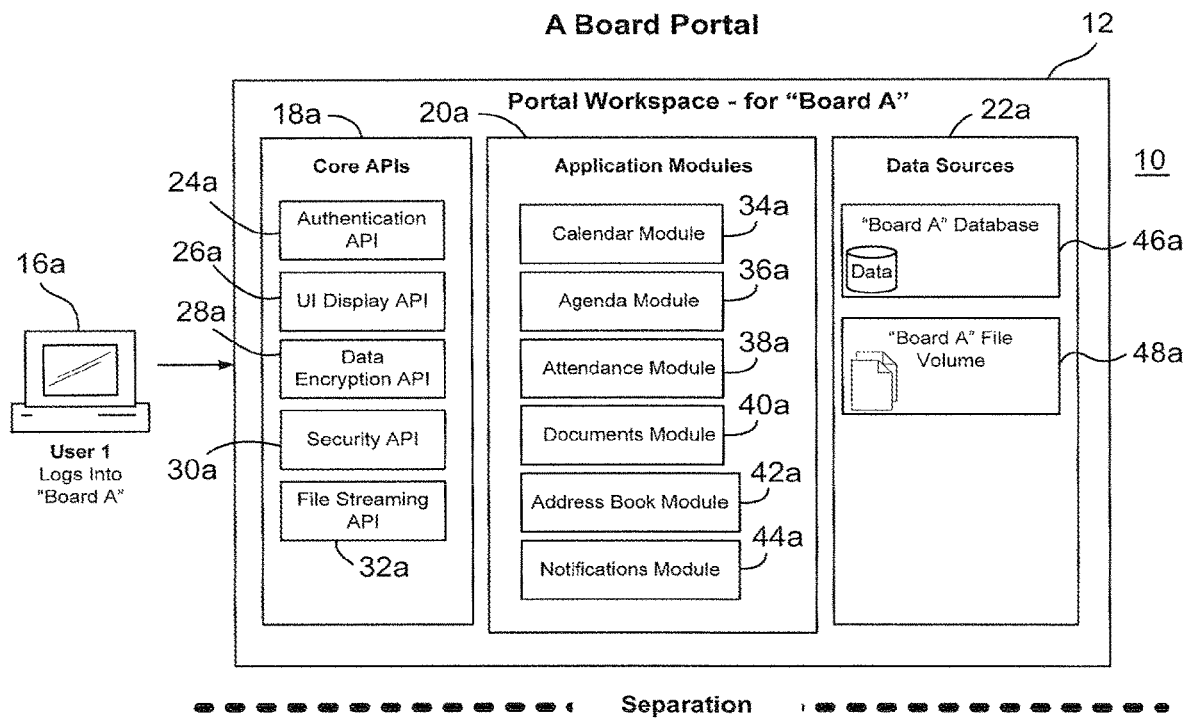
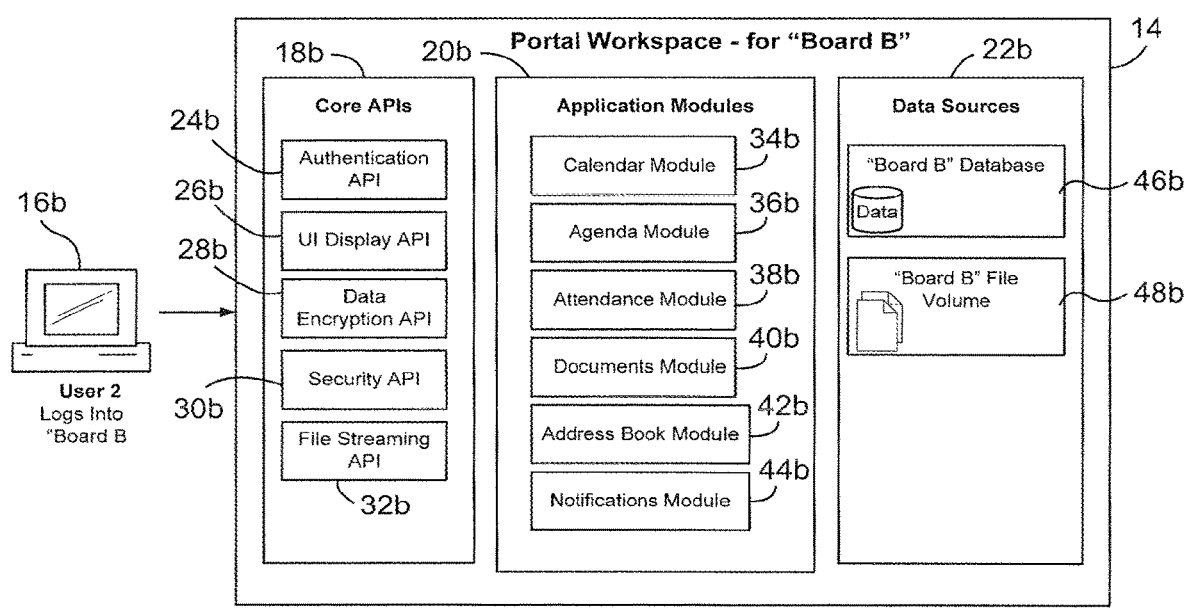

A Board Portal with Subsidiary Management System

Fig. 6

Screen 1 – Master Console Subsidiary Management Relationships Established

Directors Desk Master Console

Board Being Edited

You are editing Board A.

Subsidiary Parent Board

☑ Make Board A a Subsidiary Parent of the following Boards:

- ☑ Board B
- ☑ Board C
- ☑ Board D
- ☐ Board E
- ☐ Board F

Subsidiary Child Board

Board A is currently a Child of Board123. To change this relationship, you must edit Board123.

Screen 2 – Parent Board "Subsidiary Documents" Center

Fig. 8

Screen 3 – Parent Board Add/Edit Documents Screen for Subsidiaries

Board A

Subsidiary Documents

Actions:
New Document
New Folder

☑ 📁 Subsidiary Documents    Edit | Delete | Rights | Announce
  ☑ Document 1

Screen 4 – Subsidiary Access Rights/ACL UI Control

Assign Rights to View this Item

Individuals:
- ☑ Austin Reede
- ☑ Bob Roy
- ☐ Calhoun Jenkins
- ☑ Donnie Osmond
- ☑ Edward Edmunds
- ☐ Rory Shahlapour
- ☑ Stephen Golding
- ☑ Zachary Brown Groups:
- ☐ All Boards, All Individuals
- ☑ Board A
  - ☐ Board of Directors
  - ☑ Audit Committee
  - ☑ Finance Committee
- ☐ Board B
  - ☑ Audit & Finance Committee
  - ☐ Board of Directors
  - ☐ Executive Committee
- ☐ Board C
  - ☐ Board of Directors
  - ☑ Logistics Committee
  - ☐ Planning Committee
- ☐ Board D
  - ☐ Board of Directors
  - ☑ Executive Committee

Screen 5 – Subsidiary Notification Alert UI Control

Send A Notification Alert

Sender: Bret BW

Board A Recipients:
Recipient List – edit
Bob Jones, Sally Smith, James Ross

Subsidiary Board Recipients:
Recipient List – edit

Board B:
- Ronda Smith, Mark Jones, Brandy Zacharias

Board C:
- Jessy Ventura, Mark Smith, Tom Deloitte

Alert: New Documents to Review

[Send Notification Alert]

Screen 6 – Subsidiary Board "Parent" Documents Center

Screen 7 – Subsidiary Board's View of Parent Board's Shared Documents

Fig. 13

Screen 8 – Parent Meeting Attendee Setup Screen

Board A

Boards A, C and D Joint Board Meeting: Attendee Setup Screen

Type of Meeting
- ○ Standard – Board A Only
- ● Subsidiary – Include Boards B, C and D Select Meeting Attendees Groups:
- ☐ All Boards, All Individuals
- ☐ Board A
- ☒ Board of Directors
- ☒ Audit Committee
- ☒ Finance Committee
- ☐ Board B
- ☒ Audit & Finance Committee Individuals:
- ☒ Austin Reede
- ☐ Calhoun Jenkins
- ☐ Rory Shahlapour
- ☒ Zachary Brown

Fig. 14

Screen 9 – Parent Secure Email Screen Allowing Send to Subsidiary Boards

Board A

Actions:
Compose Mail
Manage Folders

Compose Secure Email Message

TO: Sam, Donald, John

CC: Waltz, Tom

Subsidiary "To": Board B: Roberta Smith, Walter Jenkins
Board C: Jack Hamilton, Rob Altos Subject Line:

Message Body: Enter Text

Send Message | Save as Draft

Fig. 15

Screen 10 – Parent Roster Showing Subsidiary Boards and Members

Board A

Roster of Board and Committee Members

*Show in Roster:* | All Boards, All Members ▽ |

Board A:

| Photo | Bob Jones, Chairman
2410 Center Street
Atlanta, GA 18377 |

| Photo | Laramie B. Smith, Secretary
1810 Rights Way Road
Atlanta, GA 18377 |

Board B:

| Photo | Richard Smith, Co-Chair
1 Wilbur Place
Atlanta, GA 18377 |

| Photo | Wilkie Wilks, Co-Chair
1910 WrightBrothers Avenue
Atlanta, GA 18377 |

BOARD PORTAL SUBSIDIARY MANAGEMENT SYSTEM, METHOD, AND COMPUTER PROGRAM PRODUCT

PRIORITY APPLICATION

This application is a continuation of U.S. application Ser. No. 17/033,184, filed Sep. 25, 2020, now allowed; which is a continuation of U.S. application Ser. No. 16/684,391, filed Nov. 14, 2019, now U.S. Pat. No. 10,831,697, issued on Nov. 10, 2020; which is a continuation of U.S. application Ser. No. 15/912,805, filed Mar. 6, 2018, now U.S. Pat. No. 10,509,763, issued Dec. 17, 2019; which is a continuation of U.S. application Ser. No. 13/038,053, filed Mar. 1, 2011, now U.S. Pat. No. 9,940,300, issued Apr. 10, 2018; which claims priority to U.S. Application No. 61/310,340, filed Mar. 4, 2010, the contents of each which are incorporated herein by reference.

TECHNICAL FIELD

The technology relates to board of director communication systems and workflow automation tools. In particular, the technology relates to communications and workflow processes involving a parent organization and its subsidiary boards and committees.

BACKGROUND

The role of serving on a board of directors has become increasingly difficult due to increased legislation and more stringent oversight. Board members must read more materials before each meeting, must attend more meetings, and must communicate with senior executives and other board members more than ever before.

Each of these constraints puts pressure on board members and the administrative support staff whose role it is to supply meeting materials and communications. A board portal may assist board members and administrative support staff in performing their roles more effectively. A board portal is a web site that board members of a company can access using a web browser and a password to obtain information, communication tools, and workflow automation tools relevant to their activities serving on the board.

A board portal may offer certain core functionality such as the ability for board members to access the system using transport layer security (TLS, SSL, or other cryptographic transport protocol) and some form of "strong" authentication, access a shared meeting calendar, view meeting agendas online, read and/or print out reading materials for upcoming meetings, access repository documents such as the corporate bylaws, director handbooks and more, and access the contact information of other board members. A board portal may also offer enhanced functionality such as secure email that allows board members to communicate with greater security through the portal than can be obtained using traditional email systems. Further functionality may include the ability to cast votes online or complete questionnaires and evaluations.

For complex organizations whose corporate structure includes multiple subsidiary organizations underneath the parent, using a board portal to manage all boards belonging to the organization is extremely difficult and problematic. The logical framework of the board portal configures each board to have its own unique and separate logon. As such, there is a separation of calendars, document repositories, meeting materials, address books, and communication tools between each board. Such separation between boards is desirable from the organization's perspective because each board represents a separate legal entity. A certain degree of separation between the legal entities is necessary in order to keep each board's unique business segregated. Additionally, board portals should use unique, differential encryption keys for each board's documents as another form of data segregation.

Furthermore, as the same or similar users may be tasked with managing a parent board and multiple subsidiary boards, certain tasks can become repetitive and inefficient. Prior to using a board portal system, users tasked with managing boards of parent and subsidiary companies could rely upon traditional "manual" workflow to accomplish tasks. For example, postal delivery systems, facsimile transmission, and/or electronic email could be used to distribute content to board members of both parent and subsidiary boards. But these traditional approaches do not offer large scale savings when many board members and/or boards become involved. In other words, the work required for a given task may be tied (e.g., linearly related) to the number of board members and/or number of boards associated with the task that is to be carried out.

The above-mentioned board portals may face similar challenges in that administrative support staff member must access each board's logical workspace within the board portal in order to create content for that board. Thus, for example, to distribute a document to the parent board and its 100 subsidiary boards, administrative support staff must log into 101 separate accounts and upload the same document 101 times. Further, this process may include controlling access control lists (e.g., permissions) for entities within each board. The entities may be documents, actions, etc. that require rights to be set in order to give certain users within a board access to view documents, press buttons related to a certain tasks (e.g., sending an email or setting a meeting time), or alert other board users that new content is available within the portal.

Thus, it will be appreciated that techniques for managing board portal workflow, systems, etc. are desirable. For example, techniques for improving the efficiency of managing boards within a board portal system are continuously sought while maintaining the requisite level of separation between different boards in the board portal.

SUMMARY

The inventors of the instant application recognized that one barrier for efficiently being able to manage multiple related boards in board portals is the ability (or lack thereof) to create linkages between separate parent and subsidiary boards. Further, that this limitation may, in turn, render certain activities difficult (or in some cases impossible) within the logical framework of a board portal. For example, many organizations have a committee existing at the parent board level that includes certain members of the subsidiary boards (e.g., a parent-level compensation committee made up of the chairs of each of the subsidiary boards). Within the board portal, it may not be possible to create a meeting in a single shared calendar and additionally create a meeting agenda with presentation documents that can be accessed by committee members among both the parent and subsidiary boards. Meeting attendees and related activities such as meeting attendance reporting may be handled on a per-meeting basis. As such, even the process of duplicating one's efforts to create multiple identical meetings (one within each board) cannot provide administrative support staff members with the functionality that is required to properly manage such meetings within the board portal.

Accordingly, in certain example embodiments, boards that belong to the same organization (e.g., in a parent/child relationship) may be associated with one another. Thus, a meeting (with associated topics, files, etc) created in a parent board may be viewable, accessible, etc to subsidiary boards (and their users) based on an established association between the parent and subsidiary boards.

According to one aspect of the technology, a board portal system is provided for managing multiple different boards. Each of the multiple different boards corresponds to a separate legal entity and having at least one computer-based account that is associated with at least one member. The board portal system includes a computer server accessible using a remote computer device. The computer server is configured to establish at least one association between the multiple different boards, the multiple different boards associated with a set of legal entities that belong to a pre-defined organizational structure; create a logical workspace within the board portal system for each of the multiple different boards; perform one or more tasks using one of the created logical workspaces; and facilitate access to information associated with the performed one or more tasks for computer-based accounts of each of the multiple different boards based on the established at least one association.

The computer server is further configured to send an alert to members and/or the computer-based accounts of each of the multiple different boards. The alert includes a message with a link for logging into the logical workspace associated with the board to which the member is associated.

According to another aspect of the technology, the board portal subsidiary management system manages multiple different boards belonging to an organization corresponding to a hierarchical structure that exists between the boards belonging to the organization. The server creates a logical workspace within the board portal subsidiary management system for each of the multiple different boards. One or more tasks for the multiple different boards is (are) performed using the logical workspace created for each board. The server alerts members of each of the multiple different boards to facilitate member access to information related to the one or more tasks by logging into the board to which the member belongs using the computer user device.

In one example embodiment, each of the multiple different boards is preferably associated with a corresponding encryption to segregate the data of each of the multiple different boards. A translator application programming interface decrypts data from one of the multiple different boards and provides the decrypted data to another one of the multiple different boards. Separation is also provided because each logical workspace for each of the multiple different boards segregates the data sources of each of the multiple different boards into separate databases and file volumes.

In a preferred example embodiment, one or more application programming interfaces is (are) accessible to application modules of the board portal system. A subsidiary database includes data structures that support links between the multiple different boards. The one or more application programming interfaces preferably include a parent-child hierarchy application programming interface that establishes and maintains one or more sets of parent-child relationships to link the multiple different boards together into a parent board-subsidiary board relationship. The one or more application programming interfaces may also include a workflow application programming interface that facilitates creation and distribution of content by one member to other board members of the multiple different boards.

The board portal technology described in this application creates linkages that facilitate old and new workflow patterns and communication processes based on the proper hierarchical structure that exists between the parent organization and its subsidiaries. At the same time, the requisite level of separation between the parent and subsidiary boards in the board portal is maintained.

Another aspect of the technology includes a non-transitory computer-readable medium storing computer-readable instructions which when executed by a processing system of a board portal server perform a method for interacting with multiple different boards. The multiple different boards including at least a first board and a second board that respectively correspond to separate legal entities. The at least first and second boards correspond to a pre-defined organizational structure, and the at least first and second boards respectively include at least first and second computer-accounts which are associated with one or more users. The stored instructions are configured, when executed by the processing system, to: establish an association between the first board and the second board; create a first logical workspace for the first board, the first logical workspace providing access to functionality for the at least first computer account; execute one or more tasks on the processing system and within the first logical workspace; and permit the second computer account access to information associated with the one or more tasks executed within the first logical workspace based upon the association established between the first board and the second board.

BRIEF DESCRIPTION OF THE DRAWINGS

FIG. 1 is a block diagram depicting an example architecture of a board portal;

FIG. 6 is an example screenshot depicting how parent-child relationships between boards are established by an administrator;

FIG. 8 is an example screenshot depicting the addition, removal, and management of documents in a parent subsidiary document center;

FIG. 9 is an example screenshot depicting a subsidiary access rights/ACL UI control;

FIG. 10 is an example screenshot depicting a subsidiary notification alert UI control;

FIG. 13 is an example screenshot depicting the creation of a meeting by a user on a parent board with subsidiary boards;

FIG. 14 is an example screenshot depicting a user on a parent board sending a secure email to other board members and subsidiary board members;

FIG. 15 is an example screenshot depicting a roster of a parent board and its subsidiary boards.

DETAILED DESCRIPTION

Figure 2A:
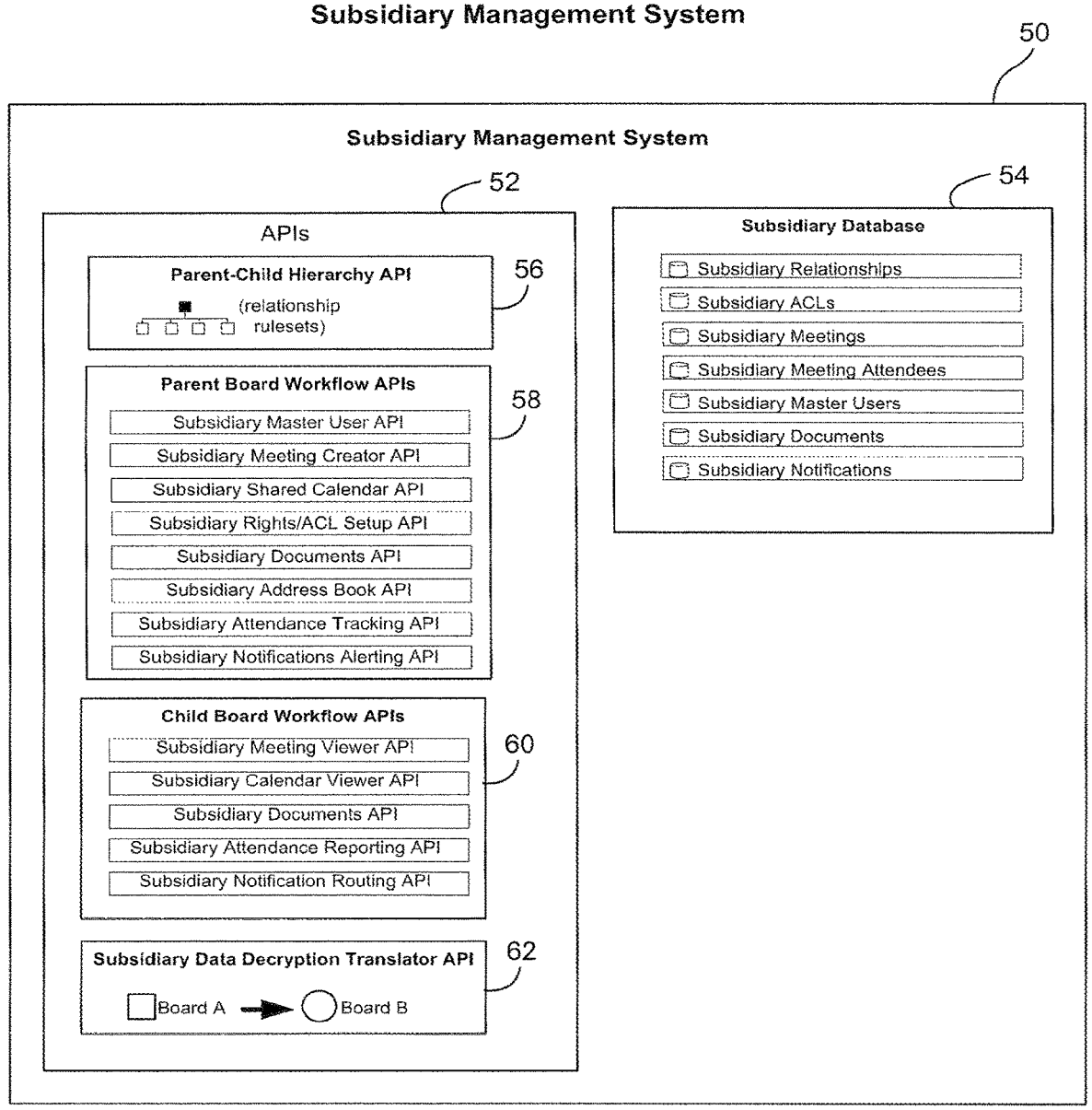
FIG. 2A is a block diagram depicting an example architecture of subsidiary management system for a board portal.

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller" may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 1 is a block diagram depicting an example architecture of a board portal. Board Portal 10 may include instances such as Board A Portal Workspace 12 and Board B Portal Workspace 14. User 16a (User 1) may log into Board Portal 10 using a laptop, PC, cell phone or any other device equipped with a browser or other user interface display.

User 1 may be a board member for Board A and have login credentials configured for access to Board A Portal Workspace 12. The Board A Portal Workspace 12 is an instance of Board Portal 10. Board A Portal Workspace 12 may be dedicated to data and communications pertaining only to Board A. This instance may not provide access to any other board's data or information, such as data belonging to Boards B, C, or D. In FIG. 1, the "Separation" dashed line represents this barrier between the boards. Similar to User 1, User 16b (User 2) may log into a Board B Portal Workspace 14, which is another instance of the Board Portal 10.

The board portal architecture includes Core APIs 18a and 18b, Application Modules 20a and 20b, and Data Sources 22a and 22b. Each part of the above board portal architecture may be, if desired, configured to work with only one board's data set at any one time. Non-limiting example core APIs may include Authentication APIs 24a and 24b, User Interface (UI) display APIs 26a and 26b, Data Encryption APIs 28a and 28b, Security APIs 30a and 30b, and File Streaming APIs 32a and 32b. Data Encryption API 28a may, for instance, use a different encryption method than is used in Data Encryption API 28b. In this way, the data of each board is explicitly separated. Thus, if all business logic should fail, one board's data may not be read by a member on another board.

Application Modules 20, likewise, may serve data for only one board at a time. Attendance Module 38a, for instance, is used to compile a list of those users who will attend a board or committee meeting. Only those users who belong to Board A in FIG. 1 will be visible to Attendance Module 38a. Attendance Module 38a may not be able to access users who belong to Board B. However, Attendance Module 38b can access the users who belong to Board B. This helps maintain the privacy of members of other boards. Other non-limiting example application modules may include, for example, calendar module 34, agenda module 36, documents module 40, address book module 42, and notifications module 44.

The separation of data between Board A Portal Workspace 12 and Board B Portal Workspace 14 may be further enforced by yet another layer of data separation. In this instance, Data Sources 22a and 22b of the above boards are segregated into separate databases 46a and 46b and file volumes 48a and 48b.

FIG. 2A is a block diagram depicting an example architecture of subsidiary management system for a board portal. Board Portal Subsidiary Management System (BPSMS) 50 allows information, documents, and communications to flow between and among an organization's parent and subsidiary board members. In one non-limiting example, BPSMS 50 can be a suitably programmed computer-based system that includes Subsidiary Application Programming Interfaces (APIs) 52 accessible to Application Modules 20 within Board Portal 10. BPSMS 50 may also include Subsidiary Database 54 containing, for example, table structures for supporting new linkages across parent and subsidiary boards. Subsidiary APIs may include, for example, Parent-Child Hierarchy API 56, Parent Board Workflow APIs 58, Child Board Workflow APIs 60, Subsidiary Data Decryption Translator API 62. Both Parent and Child Board Workflow APIs in FIG. 2 show example workflow APIs. The example parent board workflow APIs include a subsidiary master user API, a subsidiary meeting creator API, a subsidiary shared calendar API, a subsidiary rights/ACL setup API, a subsidiary documents API, a subsidiary address book API, a subsidiary attendance tracking API, and a subsidiary notification alerting API. The example child board workflow APIs include a subsidiary meeting viewer API, a subsidiary calendar viewer API, a subsidiary documents API, a subsidiary attendance reporting API, and a subsidiary notification routing API. BPSMS 50 may also be embodied as computer program instructions and data stored on a non-transitory, computer-readable storage medium that may be executed using a computer-based system to perform the BPSMS functions described in this application.

A Parent-Child Hierarchy API 56 in BPSMS architecture 50 contains a series of parent-child relationship rule sets that form the basis for linking parent and subsidiary boards together. Parent-Child Hierarchy API 56 may be first accessed using a master console utility that is only accessible to administrators of the board portal that may be responsible for setting up client boards, committees, users, etc. The Parent-Child Hierarchy API 56 may store data in the Subsidiary Relationships table(s) in Subsidiary Database 54. When the Parent-Child Hierarchy API 56 is first accessed by the application during a user's log-on, it determines whether the board the user is signing into is part of any subsidiary relationships. If it is, the Parent-Child Hierarchy API 56 establishes a set of rules governing how the board workspace is to allow data transfer and communications between the present board being logged into and other boards in the parent-child relationship. For example, a set of rules might be described as: "Board A is the parent of Boards B, C and D; therefore the Board A Application Workspace must allow for data transfer and communications to Boards B, C and D."

One or more Parent Board Workflow APIs 58 may define application logic and functionality that becomes accessible to Application Modules 20 when Parent-Child Hierarchy API 56 determines that the current board workspace is a parent for one or more other boards. The one or more Parent Board Workflow APIs 58 may provide functionality that forms the "linkages" for data transfer and communication between a parent board and its children. Such linkages can also be used to allow data transfer and communication between "sibling" boards. In other words, two boards with the same "parent" may be siblings and thus may transfer data and communicate with each other through the parent board (either directly or indirectly). In most cases, one or more Parent Board Workflow APIs 58 facilitates the creation and distribution of content to board users within the parent-child relationship.

One or more Child Board Workflow APIs 60 include application logic and functionality that becomes accessible to Application Modules 20 when the Parent-Child Hierarchy API 56 determines that the current board workspace is a child of another board. For example, a Child Board Workflow API 60 may allow users to read content created by users on the parent board.

Subsidiary Data Decryption Translator API 62 includes a set of code libraries that translates data between one board's encryption format and that of another board. Encryption of each board's data may be accomplished with different keys. Alternatively or in addition, encryption of each board's data may be accomplished using entirely different encryption techniques or algorithms (e.g., AES256, PGP, Blowfish128, etc). Thus, for example, data presented to User 1 in FIG. 1 may be encrypted and stored using AES256 encryption and data presented to User 2 in FIG. 1 may be encrypted and stored using Blowfish128 encryption.

A Subsidiary Data Decryption Translator API 62 determines which format controls the encryption and subsequent decryption of a given board's data. Once this information is determined, the Subsidiary Data Decryption Translator API 62 may receive a request from an Application Module, for example Documents Module 40a in FIG. 1, to decrypt data from Board X and provide that data in a format that can be read by Board Y. Subsidiary Data Decryption Translation API 62 first makes a request of Parent-Child Hierarchy API 56 to ensure that the two boards (X and Y in this example) are in a proper relationship together (e.g., a parent-child relationship). Subsequently, Subsidiary Data Decryption Translation API 62 retrieves, decrypts the requested data, and streams it back to the requesting Application Module.

Subsidiary Database 54 exists outside of the scope of any one board's data sets, and is thus accessible to Subsidiary Management System APIs 54 for requests involving a mix of data across various boards. Subsidiary Database 54, may include, for example, information regarding relationships between boards (e.g., parent-child relationships), Access Control Lists (ACL), Meetings, Meeting Attendees, Master Users, Documents, Notifications, etc.

Figure 2B:
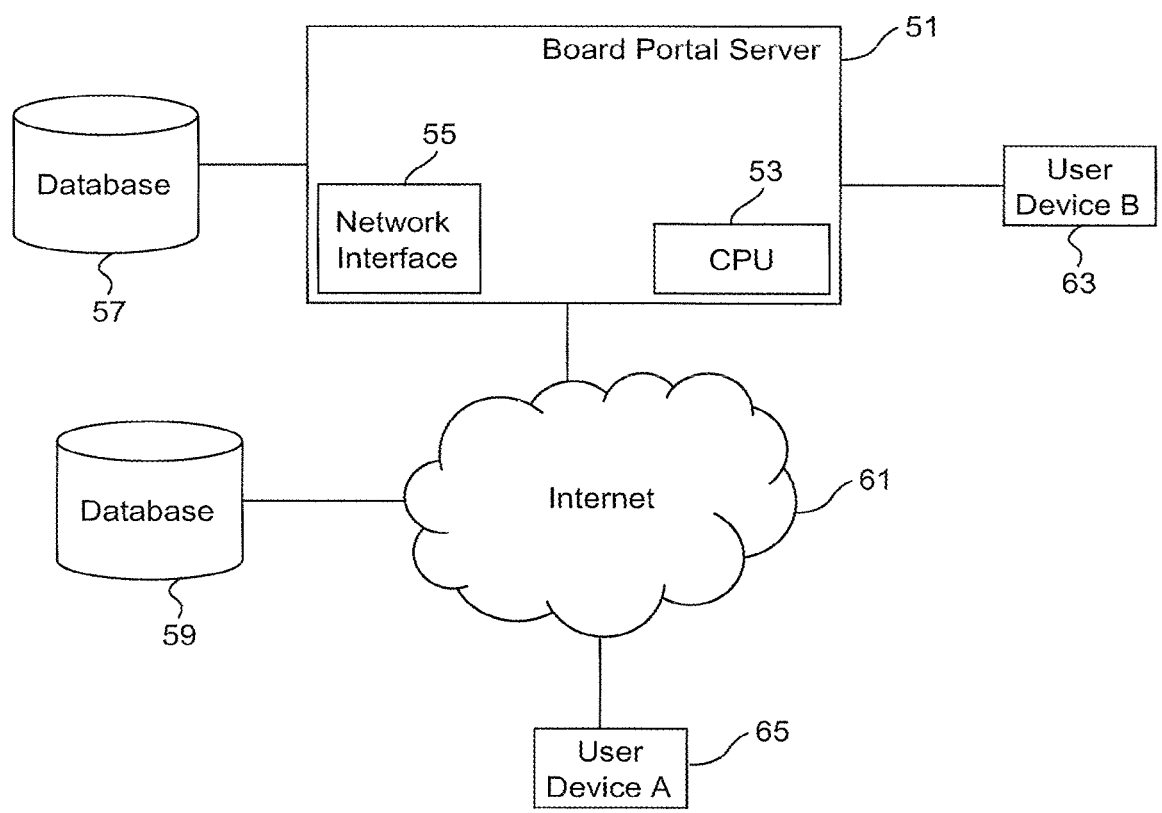
FIG. 2B is a block diagram depicting an example system architecture implementing a subsidiary management system.

FIG. 2B is a block diagram depicting an example system architecture implementing a subsidiary management system. The example system architecture includes a board portal server 51 having a network interface 55 and a CPU 53. The network interface 55 provides network access to various external resources and provides external resources access to the server system. For example, a database 57 is accessible to the server system 51, e.g., over an internal LAN. The database 57 may store board relationships, documents, etc of Board A. Multiple databases may be implemented to provide an additional layer of division between separate legal entities. This division may be, for example, a physical division such as shown at database 59 which may store documents and other associated board information for Board B. In the example shown, database 59 is located at an external physical site accessible through the internet 61. Access to database 59 from the board portal server 51 may be made using any suitable communications media. One access example is a virtual private network (VPN) or the like. The example architecture may also allow access to the boards by allowing remote user devices A 65 and B 63 to access the board portal server 51. User device B may connect to board portal server 51 from an internal (e.g., corporate) LAN via wired, wireless, or other communications media. Alternatively, User device A may connect to board portal server 51 from a remote location through a VPN or the like via wired, wireless, or other communications media.

Figure 3:
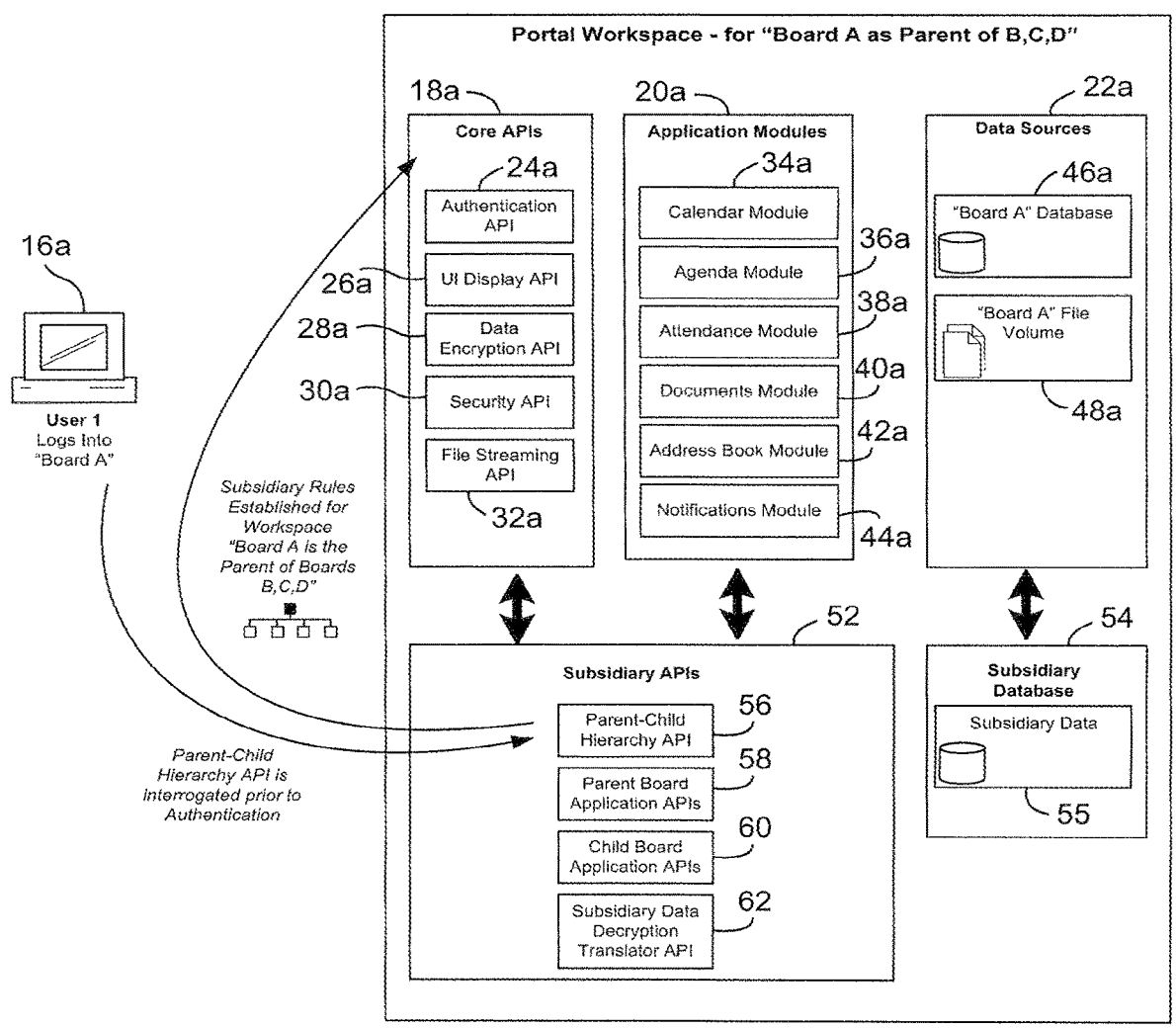
FIG. 3 is a block diagram depicting an example architecture of a board portal with a subsidiary management system.

FIG. 3 is a block diagram depicting an example architecture of a subsidiary management system for a board portal. In FIG. 3 User 1 may log into Board A. Board A is a parent board to boards B, C, and D. During the authentication process of User 1, Parent-Child Hierarchy API 56 is queried by Authentication API 24a. Parent-Child Hierarchy API 56 detects the parent-child relationship between Board A and boards B, C, and D. Subsequently, Board A's portal workspace is extended to encompass subsidiary boards B, C and D. Subsidiary APIs 52 may contain hooks allowing two-way communication to take place between Subsidiary APIs 52, Core APIs 18, and Application Modules 20, extending the functionality of the portal workspace to include Boards B, C and D. Likewise, Subsidiary Database 54 and the corresponding subsidiary data may be accessible as a new data source within the portal workspace. This allows data to become accessible across all boards within the scope of the parent-child hierarchy.

Figure 4:
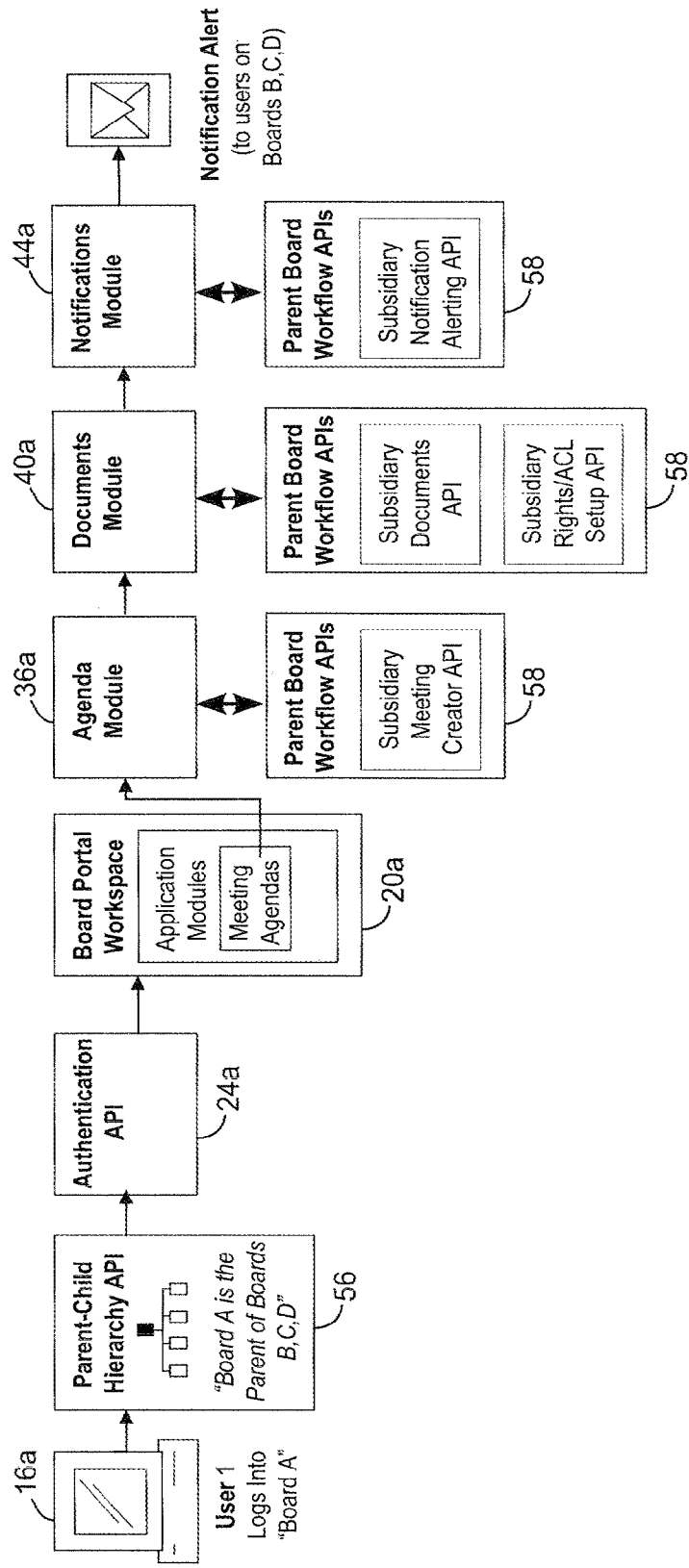
FIG. 4 is a flowchart depicting an example procedure for a user of a parent board sending data to a user of a child board.

FIG. 4 is a flowchart depicting an example procedure for a user of a parent board sending data to a user of a child board. The user of the parent board, User 1, logs into the application using her credentials for Board A. Authentication API 24a queries Parent-Child Hierarchy API 26 during the login process. The Parent-Child Hierarchy API 26 determines that Board A is the parent of Boards B, C and D. This parent-child relationship is established for the duration of User 1's session. User 1 is routed by Authentication API 24a into Board A Portal Workspace 12, where she can access Application Modules 20a. In this example, User 1 enters Meeting Agendas Module 36a. Once in the Meetings Agendas Module 36a, User 1 accesses an extended set of functionality which is available because the Agendas Module has hooks into the Subsidiary Meeting Creator API (a subset of Parent Board Workflow APIs 58 shown in FIG. 2). This extended functionality allows User 1 to create a meeting agenda that is visible to users of Board A and is also visible to users of Boards B, C, and D.

After creating the meeting agenda, User 1 may upload various documents to the meeting using Documents Module 40a. Similar to Meeting Agenda Module 36a, Documents Module 40a, may have hooks into the Subsidiary Documents API and the Subsidiary Rights/ACL Setup API of Parent Board Workflow APIs 58. The Subsidiary Documents API allows documents to be visible across boards so long as they are related via the parent-child hierarchy. The Subsidiary Rights/ACL Setup API allows User 1 to select which users may access the uploaded documents. These users may be users within Board A or users of subsidiary Boards B, C and D.

Lastly, User 1 enters Notifications Module 44a, which sends out email, fax, wireless/SMS or other forms of alerts to notify users that new content is available. As with the above modules, Notifications Module 44a includes extended functionality in the form of hooks into the Subsidiary Notification Alerting API of Parent Board Workflow APIs 58. Similar to the functionality described above, User 1 may select users from Boards B, C and D in addition to users from Board A. The alert message is then sent out to all selected users.

Figure 5:
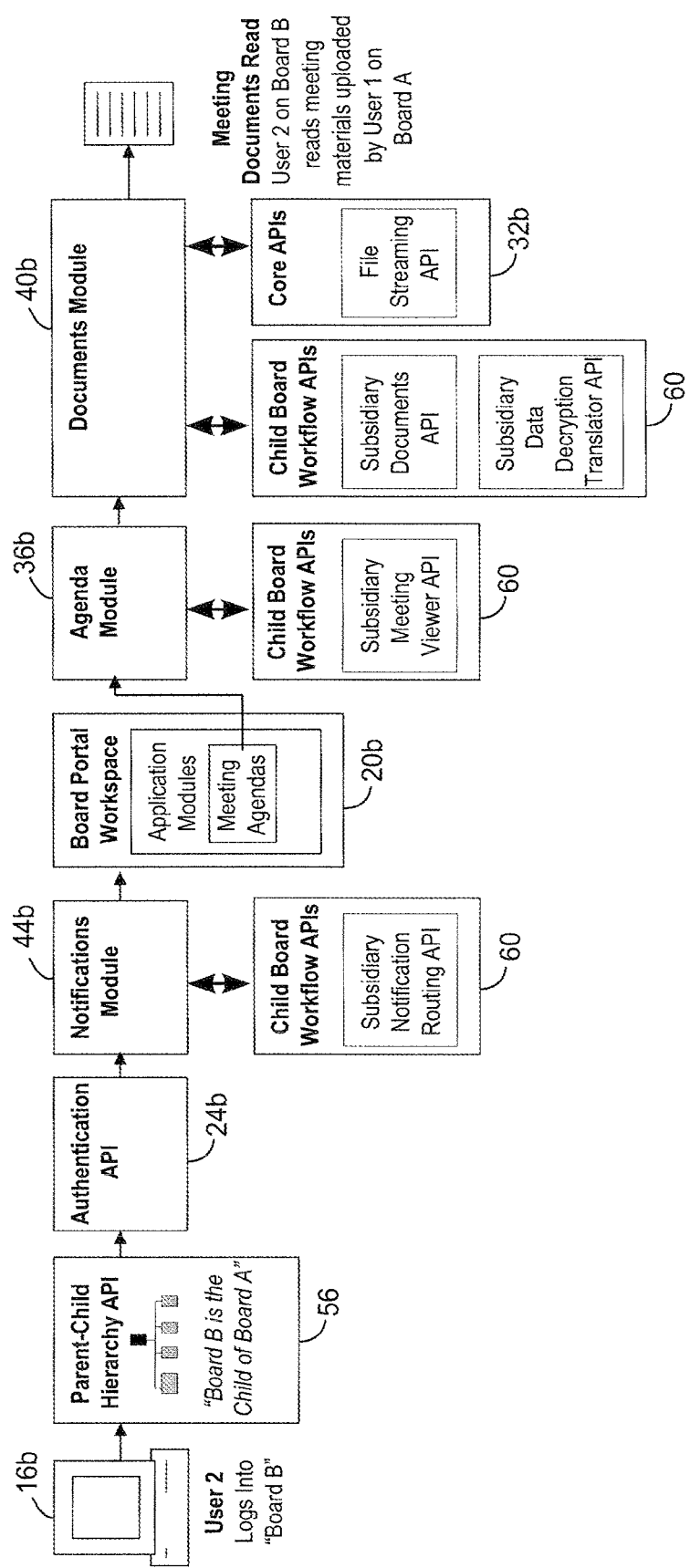
FIG. 5 is a flowchart depicting an example procedure for a user of a child board receiving data from a user of a parent board.

If the appropriate relationships are defined between two subsidiary boards, then workflows may be implemented that allow communication and data sharing between sibling boards. FIG. 5 is a flowchart depicting an example procedure for a user of a child board receiving data from a user of a parent board. User 2 receives an alert, such as an email, from the board portal system (see above). User 2 may click on a link in that alert. The link may contain variables embedded within a URL of the link, or some other form of identifiers, that are passed to Authentication API 24b when User 2 begins the login process.

Authentication API 24b queries Parent-Child Hierarchy API 56 and determines that Board B is a child of Board A. After successfully authenticating User 2, Authentication API 24b routes User 2 to Notifications Module 44b, passing along the variables that were obtained from the above URL identifier. Notifications Module 44b, which under normal circumstances can only handle alerts within Board B, contains extended functionality via the Subsidiary Notification Routing API of Child Board Workflow APIs 60 that allows it to locate data elements of Boards A, C, and D. Each of these boards are within the scope of the parent-child hierarchy related to Board B. Notifications Module 44b identifies that User 2 has been sent into the application to look at a specific meeting announcement sent by User 1 of Board A. User 2 is appropriately routed to the agenda for that specific meeting.

To display the agenda for that meeting, the board portal system relies upon Agenda Module 36b. As with the above modules, this module also has access to extended functionality through the Subsidiary Meeting Viewer API of Child Board Workflow APIs 60. Subsidiary Meeting Viewer API of Child Board Workflow APIs 60 allows it to retrieve meeting agendas belonging to other boards within the parent-child hierarchy. As a result, User 2 can view the agenda while logged into Board B that User 1 created while logged into Board A. User 2 next clicks on a document that is associated with the meeting agenda to open it.

The board portal system relies upon Documents Module 40b to process document views. As with the above modules, Documents Module 40b also has access to extended functionality via hooks into two workflow APIs of Child Board Workflow APIs 60. The first is the Subsidiary Documents API. This API allows users of one board to access documents belonging to another board so long as both boards are related via a parent-child hierarchy. The second is the Subsidiary Data Decryption Translator API. This API is used to decrypt stored encrypted documents. As discussed above, encryption keys and or methods may vary between different boards. For example, in FIG. 5, the document stored by User 1 of Board A may have been encrypted using a different algorithm than the algorithm used for data stored from Board B. Thus, the Subsidiary Data Decryption Translator API is used to "translate" documents of one board such that the documents may be read and/or viewed by members of another board. Documents Module 40b next streams out the document content to User 2 via File Streaming API 32b, and User 2 is thereby able to view the documents uploaded by User 1. Additionally, as with the FIG. 4, workflows involving subsidiary-to-subsidiary data sending may be configured.

For illustrative purposes only, several non limiting example screenshots are now described. FIG. 6 is an example screenshot depicting how parent-child relationships between boards are established by an administrator. Although multiple configurations could be used, the current screen shows a page within the "Master Console." The Master Console may be a web-based application used by a set of master administrators who are able to create boards and manage other top-level objects within the application. In the present example, a master administrator has already created Boards A, B, C, D, E and F, and has now clicked into an edit screen to change the properties of Board A.

On the screen shown, the master administrator establishes Board A as a Subsidiary Parent Board and selects one or more other boards to become "subsidiary children" boards of Board A. Board A may also be a child of another board. For example, in FIG. 6, Board A is a child board of Board 123. For FIGS. 6-15, it is assumed that Board A is established as the parent board of Boards B, C and D within the board portal system.

Figure 7:
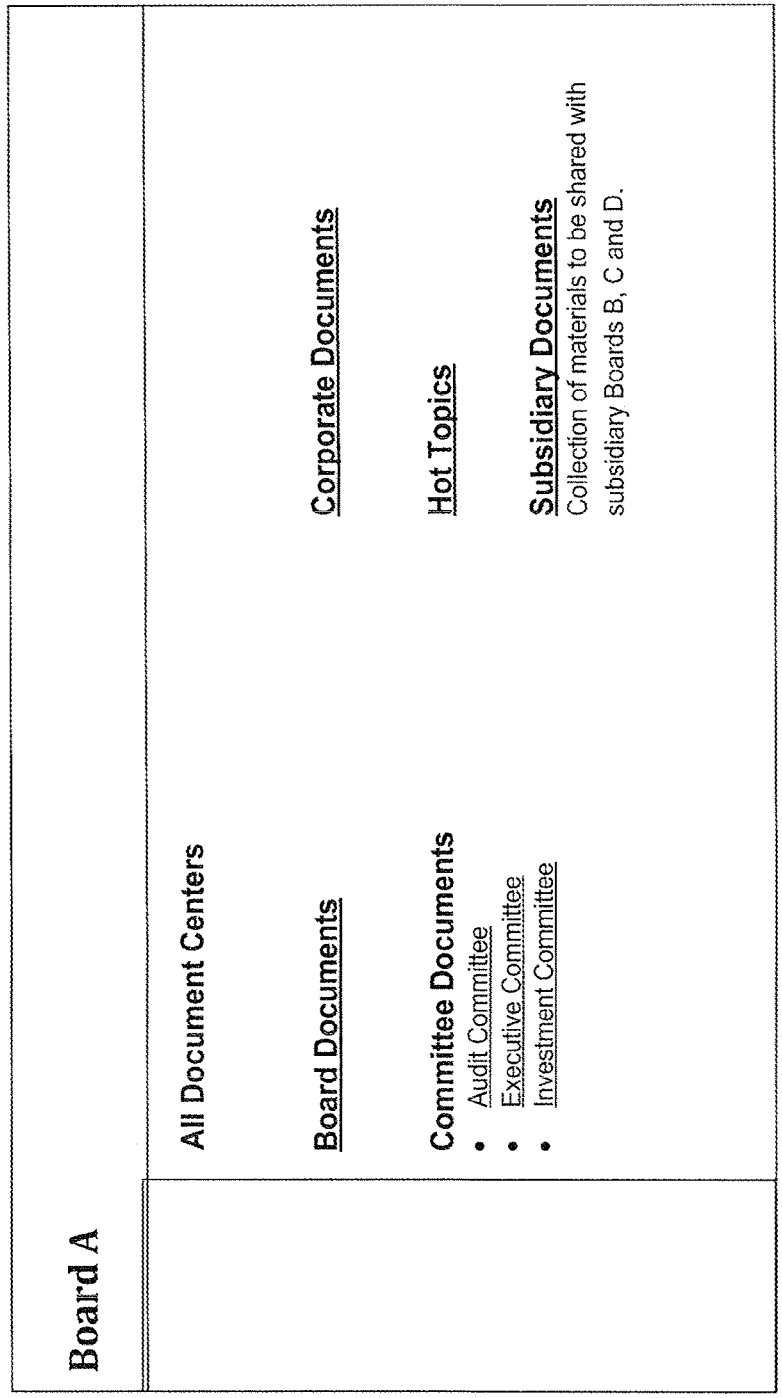
FIG. 7 is an example screenshot depicting a parent document center for managing parent subsidiary documents in a board portal.

FIG. 7 is an example screenshot depicting a parent document center for managing parent subsidiary documents in a board portal. As Board A is the parent board of Boards B, C and D, the Documents Module is expanded to include hooks into the Subsidiary Documents API. As seen in FIG. 7 this results in a new document center appearing on this screen. Entitled "Subsidiary Documents," this new document center is a document repository where documents can be shared with users of Boards B, C and D (the subsidiary boards). With a separate document center, each board may maintain its own corporate documents (e.g., bylaws and press releases) and other documents. However, different document center configurations may be implemented. For example, a single document center may display and contain both parent and subsidiary documents.

FIG. 8 is an example screenshot depicting the addition, removal, and management of documents in a parent subsidiary document center. In this case, a user within Board A has clicked into the Subsidiary Documents Center and has uploaded one document entitled "Document 1." As shown, the user can upload additional new documents, organize documents into folders, and/or modify the current documents (including editing, deleting, setting rights, and announcing). Although any document within this screen can be seen by users within Boards B, C and D, (as well as those within Board A), the actual access rights established for each document may determine individual user access to each document.

FIG. 9 is an example screenshot depicting the Subsidiary Access Rights/ACL user interface control. This control is the user interface element of the Subsidiary Rights/ACL Setup API. Access rights associated with data for a given application govern which users can view unique data elements. Without being specifically granted access to view a given piece of data, a user may not view or edit that piece of data.

The Assign Rights screen provides functionality that lists out the full set of users who can be given view access to a given item. As shown, the Subsidiary Rights/ACL user interface control contains not just those users within Board A (the current board), but also those within Boards B, C and D (the subsidiary child boards). To establish view rights, the user selects the sub-groups within each board on the left-hand side of the screen. As sub-groups are selected, the users belonging to those sub-groups appear on the right-hand side of the screen. Each user can be selected or un-selected, giving the user granular control over ACLs for a specific item.

FIG. 10 is an example screen shot depicting a subsidiary notification alert UI control. A user may wish to send out a notification to other users regarding newly created content. For example, a new document, meeting, or other content may have been created by a user in FIG. 8. Subsequently, the user may grant view access to the new content to various users in FIG. 9. Notifications Module 44*a* is extended to "pull in" users from any board within the parent-child hierarchy. Thus, in FIG. 10 user "Bret BW," a user associated with Board A, has selected Board A users "Bob Jones," "Sally Smith," and "James Ross" to send a notification to. Further, as shown, Bret has also selected six users of Boards B and C to receive the notification. Thus, the alert created by Bret will be sent to users of Boards A, B, and C.

Figure 11:
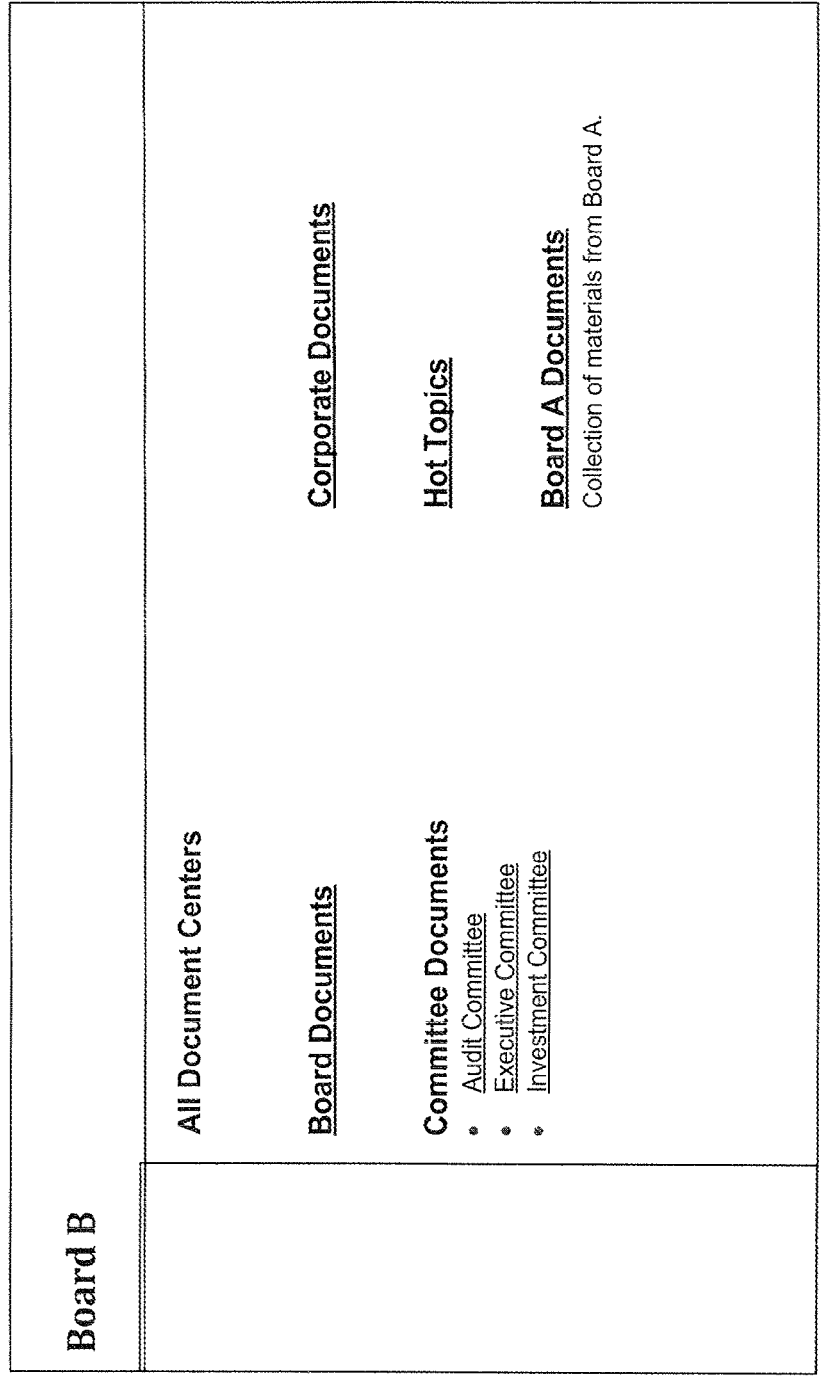
FIG. 11 is an example screenshot depicting a document center for a subsidiary board.

FIG. 11 is an example screenshot depicting a document center for a subsidiary board. Board B is a child board of Board A. As a result, when a user of Board B logs in, the user will see an entirely new document center entitled "Board A Documents." This document center may be similar to the document center shown in FIG. 7 with the name "Subsidiary Documents." Because any board can be both a parent for other boards and a child of another board, naming schemes may be provided to assist users in quickly and easily identifying the source of documents within the document centers.

Figure 12:
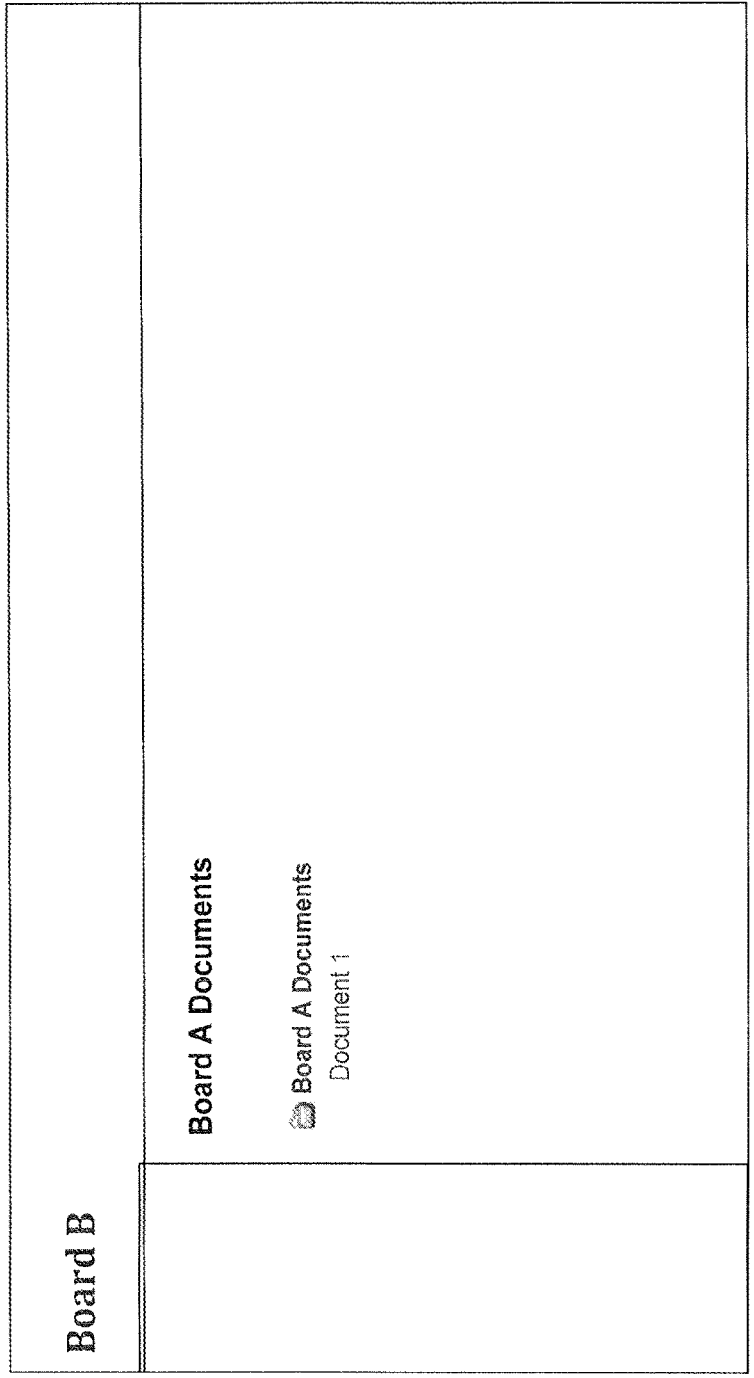
FIG. 12 is an example screenshot depicting the documents available to a subsidiary board from a parent board.

FIG. 12 is an example screen screenshot depicting the documents available to a subsidiary board from a parent board. This screen gives a user access to the actual documents contained within this new document center. All of the documents located within this screen are created by users within Board A, yet are still available to users of Board B.

FIG. 13 is an example screenshot depicting the creation of a meeting by a user on a parent board with subsidiary boards. For example, a user of Board A can create a meeting that includes users of subsidiary child boards B, C, and D. First, the user clicks "Subsidiary" under the "Type of Meeting" selection. The selection of the type of meeting causes the "Select Meeting Attendees" user interface selection control to appear. This control is an instance of the Subsidiary Access Rights/ACL user interface control shown above in FIG. 9. The control facilitates the selection of meeting attendees for a meeting. As described above, Subsidiary Management System 50 may use meeting workflows to manage "mixed board" meetings. FIG. 13 shows that the user of Board A created a joint board meeting. The meeting includes the members of the Board of Directors belonging to Boards A, C and D. Subsidiary Management System 50 places all of these users within one consolidated attendee listing within the board portal even though they exist in separate and segregated board portal workspaces.

FIG. 14 is an example screenshot depicting a user on a parent board sending a secure email to other board members and subsidiary board members. The screenshot provides an example of how a user on Board A uses a Secure Email system to send a communication, not just to users within the current board, but also to users within Boards B, C and D (as these are related within the parent-child hierarchy). To accomplish this, a user on Board A clicks on the "Subsidiary To" button. Subsequently, an instance of the Subsidiary Access Rights/ACL user interface control is displayed. As discussed above this control allows the view and selection of users of subsidiary boards. In this example, the user of Board A selects Roberta Smith and Walter Jenkins of Board B and Jack Hamilton and Rob Altos of Board C. The user may then send the secure email to the above recipients.

FIG. 15 is an example screenshot depicting a roster of a parent board and its subsidiary boards. The displayed roster (an address book containing the contact information for users within each board) has been extended to include not just users within the current board (Board A), but also any other boards within the parent-child hierarchy (Boards B, C and D). This sharing of contact information facilitates the collaboration and communication necessary between related boards.

Figure 16:
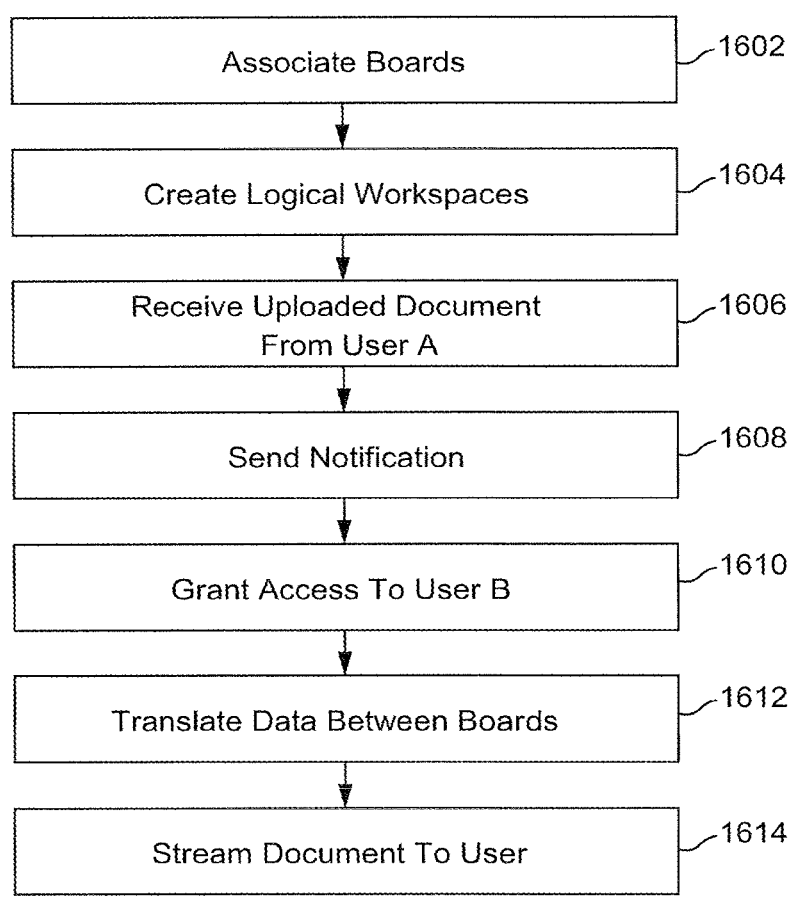
FIG. 16 is a flowchart depicting an example process according to certain example embodiments.

FIG. 16 is a flowchart depicting an example process according to certain example embodiments. In step 1602, multiple different boards are associated with each other based on the relationship of the legal entities. For example, boards that are related via a legal relationship of owner/subsidiary may have a parent-child relationship established in a board portal system. Next in step 1604, logical workspaces are created for the boards. As discussed above, the logical workspaces may facilitate user creation of tasks that are performed by the board portal system. Thus, in step 1606 a document is uploaded from User A. In this example process, User A is a member of Board A and has a computer account associated therewith. Once the document is uploaded in step 1606, workflows or businesses processes may be checked to see who should have access to the document. In certain example embodiments, this process may be automatic or hidden from the user and the permissions or who is notified is based on who uploaded the document. In certain example embodiments, User A may expressly set the permissions, notifications, etc. According, in step 1608 a notification is sent to other users of the board portal system. For example, User B is sent a notification. User B is a member of Board B. Board B is a child board of Board A. Thus the notification sent in step 1608 is an inter-board notification. As described above, upon receipt of the notification, User B may click on the link or notification and be granted access to the file, etc in step 1610.

Also as discussed above, the security (e.g., encryption) of files between different boards may be different. Accordingly, in step 1612 the data of the earlier uploaded document is translated from the encryption scheme of Board A to the encryption scheme of Board B. After, or during, this process the document may be streamed to the computer that User B is using in step 1614. Accordingly, User B, a member Board B, may view a document uploaded to the board portal system by User A, a member of Board A.

It will be appreciated that certain steps may be omitted from the above process. For example, if a board is already created and has an associated logical workspace, then, for example, step 1604 may be skipped or omitted.

Although various embodiments have been shown and described in detail, the claims are not limited to any particular embodiment or example. Other types of business relationships that may have multiple boards are also contemplated. For example, the above technology may be used in a non-traditional parent-child relationship, such as joint ventures, partnerships, or a company with two parent companies. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

We claim:

1. A computer system comprising:
at least one hardware processor; and
non-transitory computer readable storage configured to store instructions that, when executed by the at least one hardware processor, cause the at least one hardware processor to perform operations comprising:
storing, for each respective one of a plurality of different electronic board portals, digital data of the respective one of the plurality of different electronic board portals in an encrypted form, wherein each one of the plurality of different electronic board portals is associated with at least one computer-based account for accessing the digital data of a respective board portal, wherein the plurality of different electronic board portals includes a first electronic board portal and a second electronic board portal;
storing an encrypted form of first digital data, which is associated with the first electronic board portal, to the non-transitory computer readable storage, wherein the encrypted form of the first digital data is based on which one of the plurality of different electronic board portals the first digital data is associated with;
storing, to the non-transitory computer readable storage, a link between at least the first electronic board portal and the second electronic board portal;
based on a request in association with a second computer-based account that is associated with the second electronic board portal, retrieving the encrypted form of the first digital data that is stored in association with the first electronic board portal, wherein the retrieval is authorized based at least in part on the stored link between the first electronic board portal and second electronic board portal; and
communicating, to a remote computer system that is associated with the second computer-based account, data that is based on the encrypted form that was retrieved from the non-transitory computer readable storage.

2. The computer system of claim 1, wherein the operations further comprise:
creating a logical electronic board portal workspace for each one of the plurality of different electronic board portals.

3. The computer system of claim 2, wherein the operations further comprise:
transferring digital data to different ones of the logical electronic board portal workspace based at least in part on links that are stored between associated ones of the plurality of different electronic board portals.

4. The computer system of claim 2, wherein the operations further comprise:
granting access to the electronic board portal workspace for the first electronic board portal based on the stored link between the first electronic board portal and the second electronic board portal.

5. The computer system of claim 2, wherein the operations further comprise:
while a user-account associated with the first electronic board portal is logged into the logical electronic board portal workspace that is created for the first electronic board portal, granting access, for the user-account associated with the first electronic board portal, to digital data associated with at least one other electronic board portal based on a stored link between the first electronic board portal and the at least one other electronic board portal.

6. The computer system of claim 1, wherein the operations further comprise:
encrypting the first digital data into the encrypted form; and
decrypting the encrypted form of the first digital data, wherein the data communicated to the remote computer system that is associated with the second computer-based account is further based on the encrypted form of the first digital data that has been decrypted, wherein the data that is communicated to the remote computer system is streamed.

7. The computer system of claim 1, wherein digital data associated with each of the plurality of different electronic board portals is stored in a separate database.

8. The computer system of claim 1, wherein the operations further comprise:
executing, based on the request, one or more of a plurality of different processing rules that control how data may be transfer and/or how communications may be performed between any other ones of the plurality of different electronic board portals that are linked to the second electronic board portal through a stored link.

9. The computer system of claim 1, wherein the link is identified, in the non-transitory computer readable storage, as being a parent-child link.

10. The computer system of claim 1, wherein the operations further comprise:
extending an electronic board portal workspace for a parent electronic board portal to include all subsidiary electronic board portals of the parent electronic board portal, wherein the extension is conditioned upon establishment of link that is a parent-child link between the parent electronic board portal and the subsidiary electronic board portals.

11. The computer system of claim 1, wherein the digital data includes at least one of a digital document, meeting calendar data, contact data, meeting agenda data.

12. A computer-implemented method comprising:
storing, to computer data storage and for each respective one of a plurality of different electronic board portals, digital data of the respective one of the plurality of different electronic board portals in an encrypted form, wherein each one of the plurality of different electronic board portals is associated with at least one computer-based account for accessing the digital data of a respective board portal, wherein the plurality of different electronic board portals includes a first electronic board portal and a second electronic board portal;
storing an encrypted form of first digital data, which is associated with the first electronic board portal, to the computer data storage, wherein the encrypted form of the first digital data is based on which one of the plurality of different electronic board portals the first digital data is associated with;
linking at least the first electronic board portal to the second electronic board portal by storing a link, to the computer data storage, that the first electronic board portal is linked to the second electronic board portal;
based on a request in association with a second computer-based account that is associated with the second electronic board portal, retrieving the encrypted form of the first digital data that is stored in association with the first electronic board portal, wherein the retrieval is authorized based at least in part on the stored link between the first electronic board portal and second electronic board portal; and
communicating, to a remote computer system that is associated with the second computer-based account, data that is based on the encrypted form that was retrieved from the computer data storage.

13. The computer-implemented method of claim 12, further comprising:
creating a logical electronic board portal workspace for each one of the plurality of different electronic board portals.

14. The computer-implemented method of claim 13, further comprising:
transferring digital data to different ones of the logical electronic board portal workspace based at least in part on links that are stored between associated ones of the plurality of different electronic board portals.

15. The computer-implemented method of claim 13, further comprising:
granting access to the electronic board portal workspace for the first electronic board portal based on an established association between the first electronic board portal and at least one other electronic board portal.

16. The computer-implemented method of claim 12, further comprising:
encrypting the first digital data into the encrypted form; and
decrypting the encrypted form of the first digital data, wherein the data communicated to the remote computer system that is associated with the second computer-based account is further based on the encrypted form of the first digital data that has been decrypted,
wherein the data that is communicated to the remote computer system is streamed.

17. The computer-implemented method of claim 12, further comprising:
executing, based on the request, one or more of a plurality of different processing rules that control how data may be transfer and/or how communications may be performed between any other ones of the plurality of different electronic board portals that are linked to the second electronic board portal through a stored link.

18. The computer-implemented method of claim 12, wherein the digital data includes at least one of a digital document, meeting calendar data, contact data, meeting agenda data.

19. The computer-implemented method of claim 12, further comprising:
extending an electronic board portal workspace for a parent electronic board portal to include all subsidiary electronic board portals of the parent electronic board portal, wherein the extension is conditioned upon establishment of link that is a parent-child link between the parent electronic board portal and the subsidiary electronic board portals.

20. One or more non-transitory computer-readable media comprising instructions that when executed by at least one hardware processor of a computer system cause the computer system to perform operations comprising:
storing, to computer data storage and for each respective one of a plurality of different electronic board portals, digital data of the respective one of the plurality of different electronic board portals in an encrypted form, wherein each one of the plurality of different electronic board portals is associated with at least one computer-based account for accessing the digital data of a respective board portal, wherein the plurality of different electronic board portals includes a first electronic board portal and a second electronic board portal;
storing an encrypted form of first digital data, which is associated with the first electronic board portal, to the computer data storage, wherein the encrypted form of the first digital data is based on which one of the plurality of different electronic board portals the first digital data is associated with;
linking at least the first electronic board portal to the second electronic board portal by storing a link, to the computer data storage, that the first electronic board portal is linked to the second electronic board portal;
based on a request in association with a second computer-based account that is associated with the second electronic board portal, retrieving the encrypted form of the first digital data that is stored in association with the first electronic board portal, wherein the retrieval is authorized based at least in part on the stored link between the first electronic board portal and second electronic board portal; and communicating, to a remote computer system that is associated with the second computer-based account, data that is based on the encrypted form that was retrieved from the computer data storage.

* * * * *